F. ROGERS & B. E. TAYLOR.
BOX LOADING MACHINE.
APPLICATION FILED MAY 19, 1916.
1,247,722.
Patented Nov. 27, 1917.
3 SHEETS—SHEET 1.
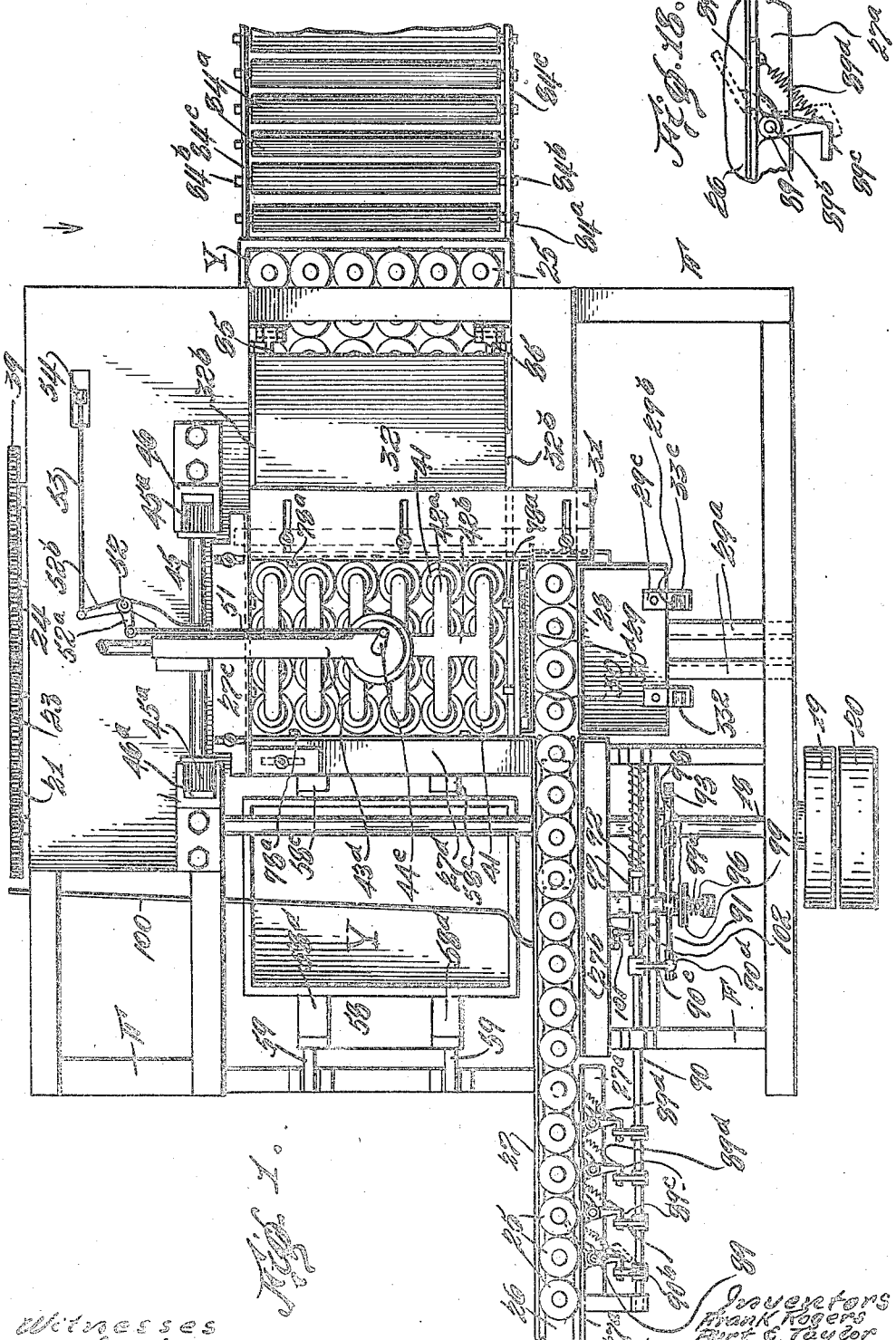

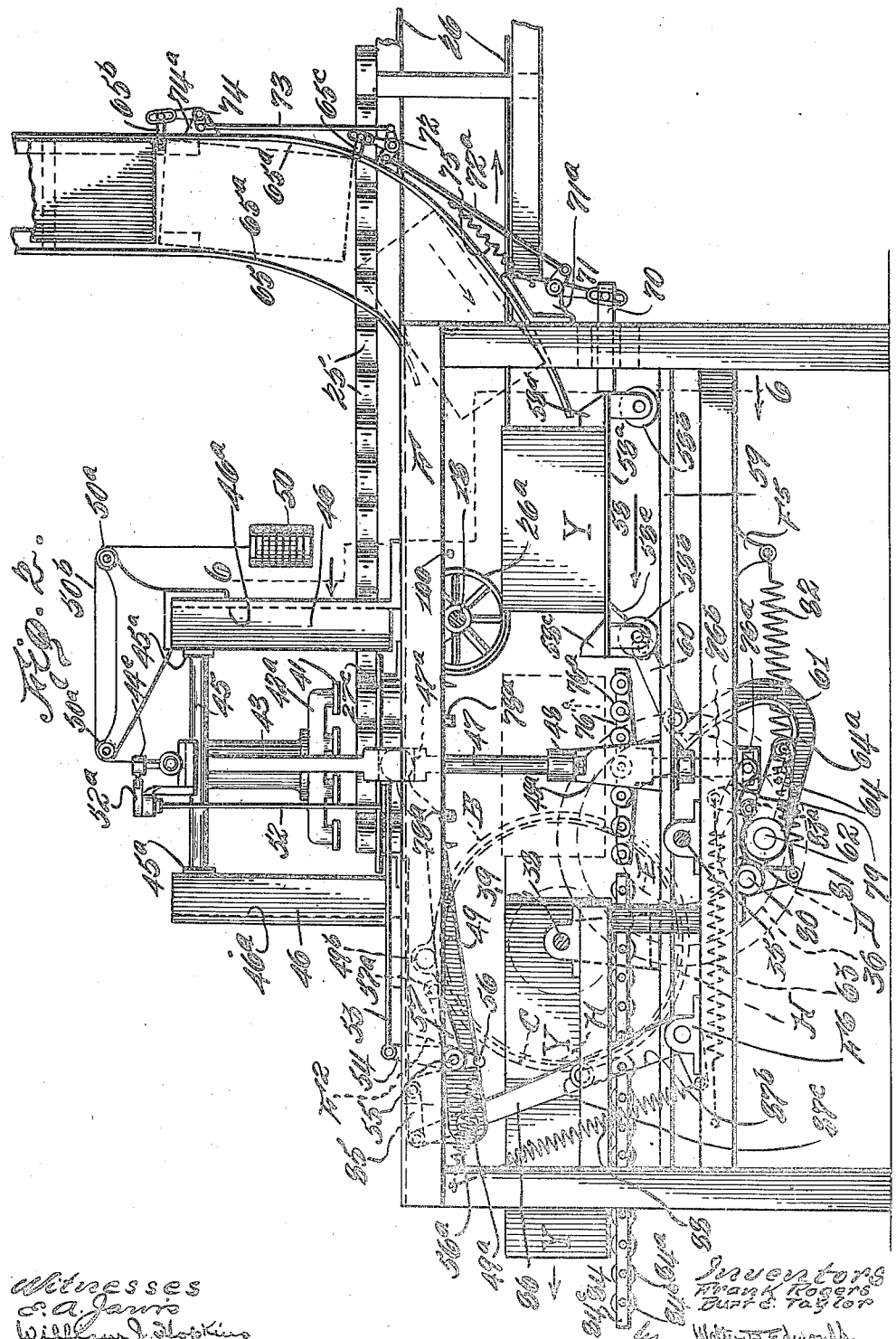

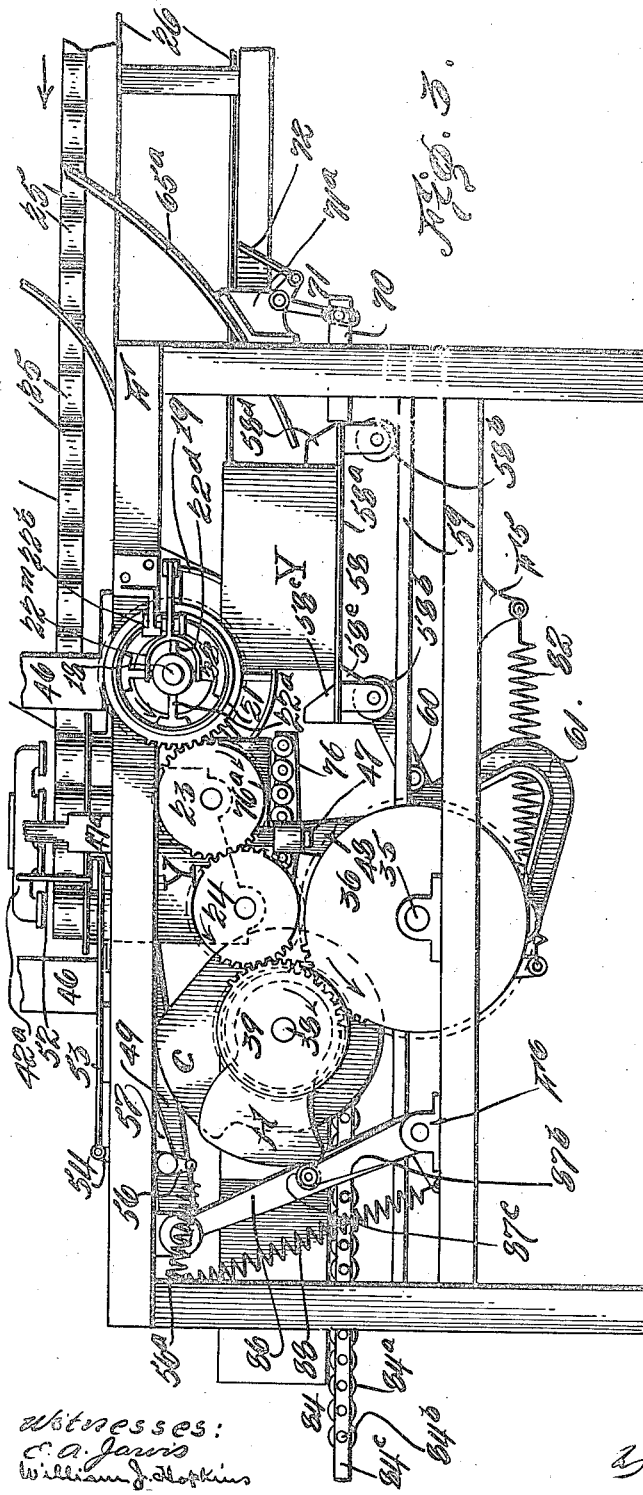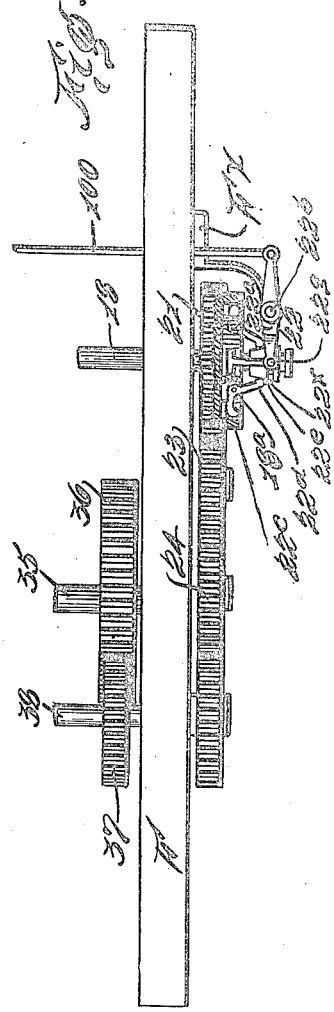

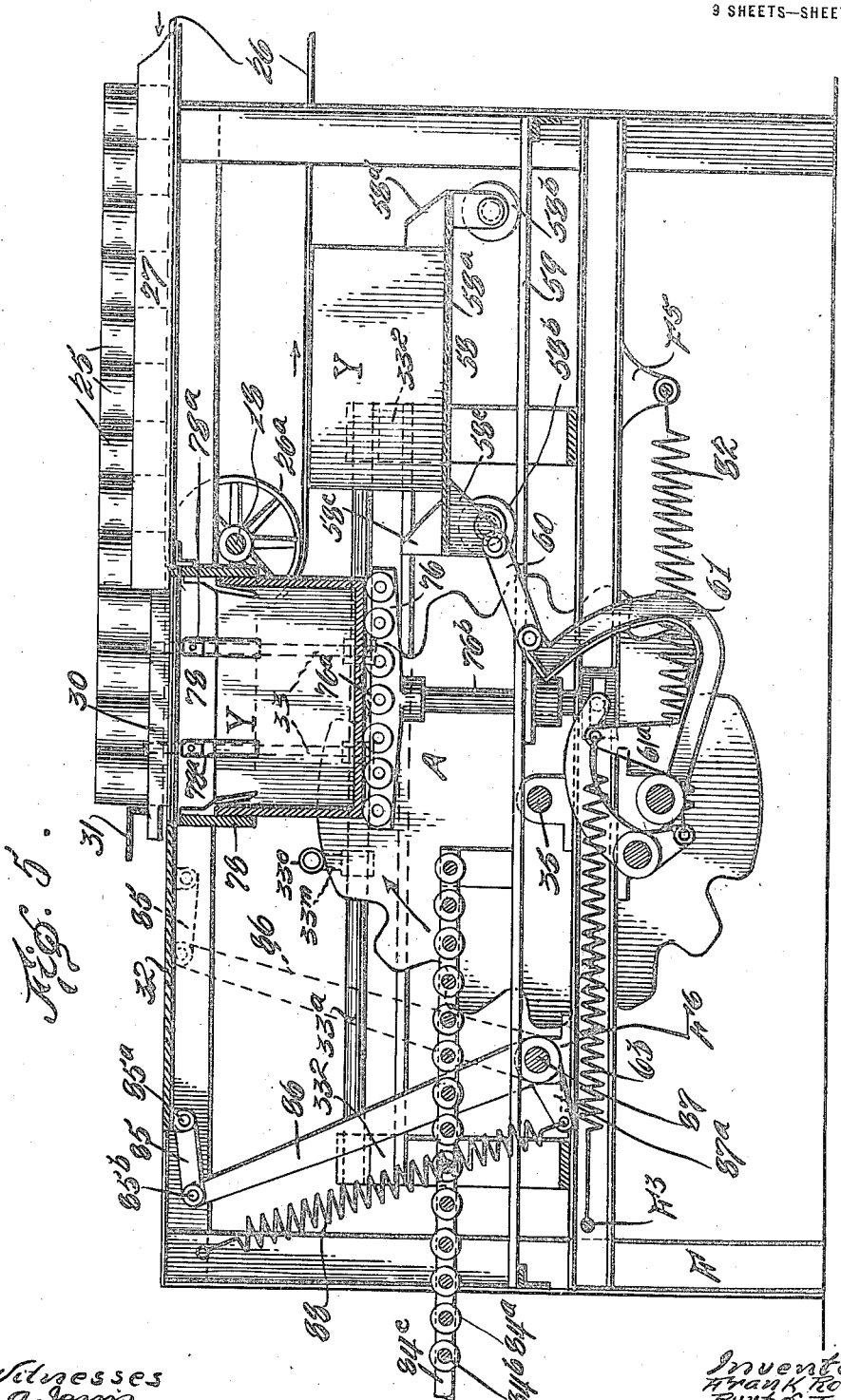

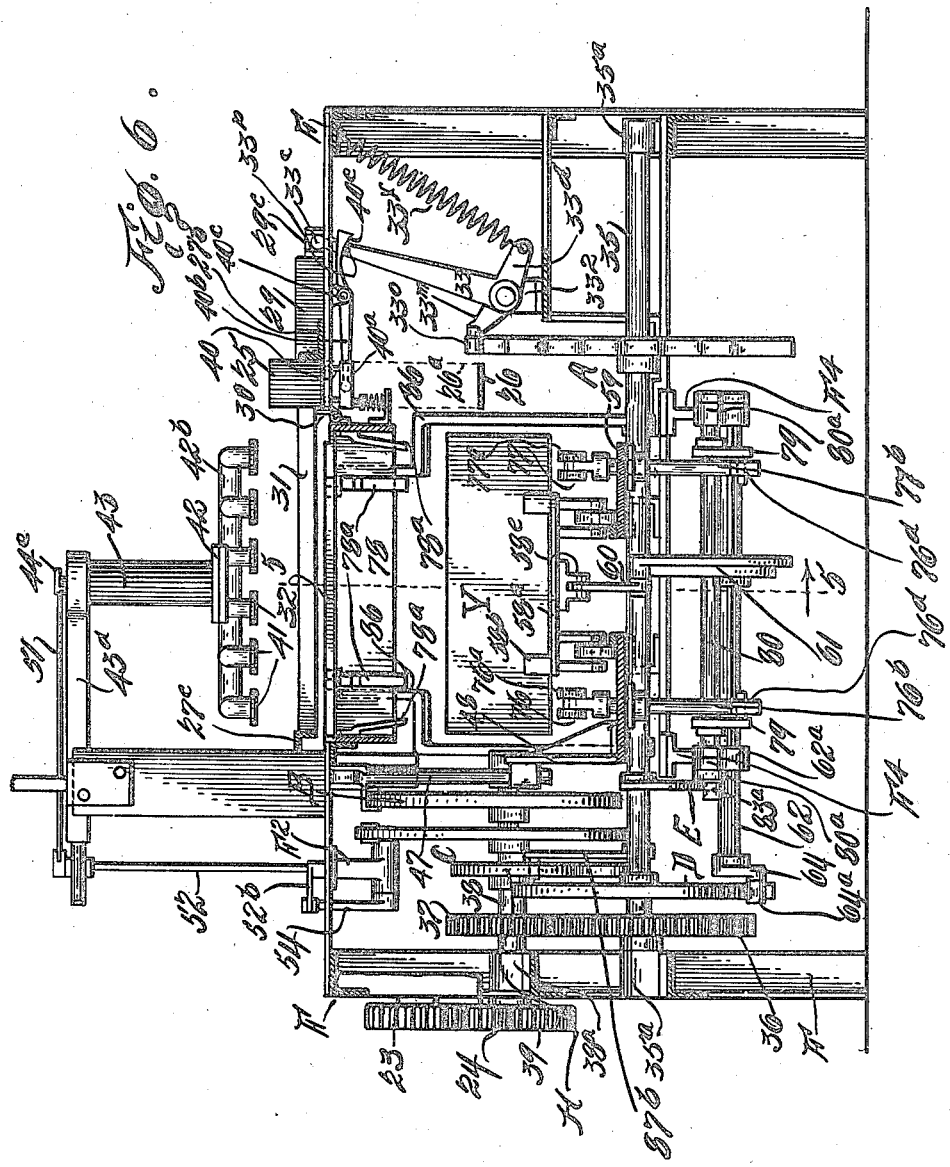

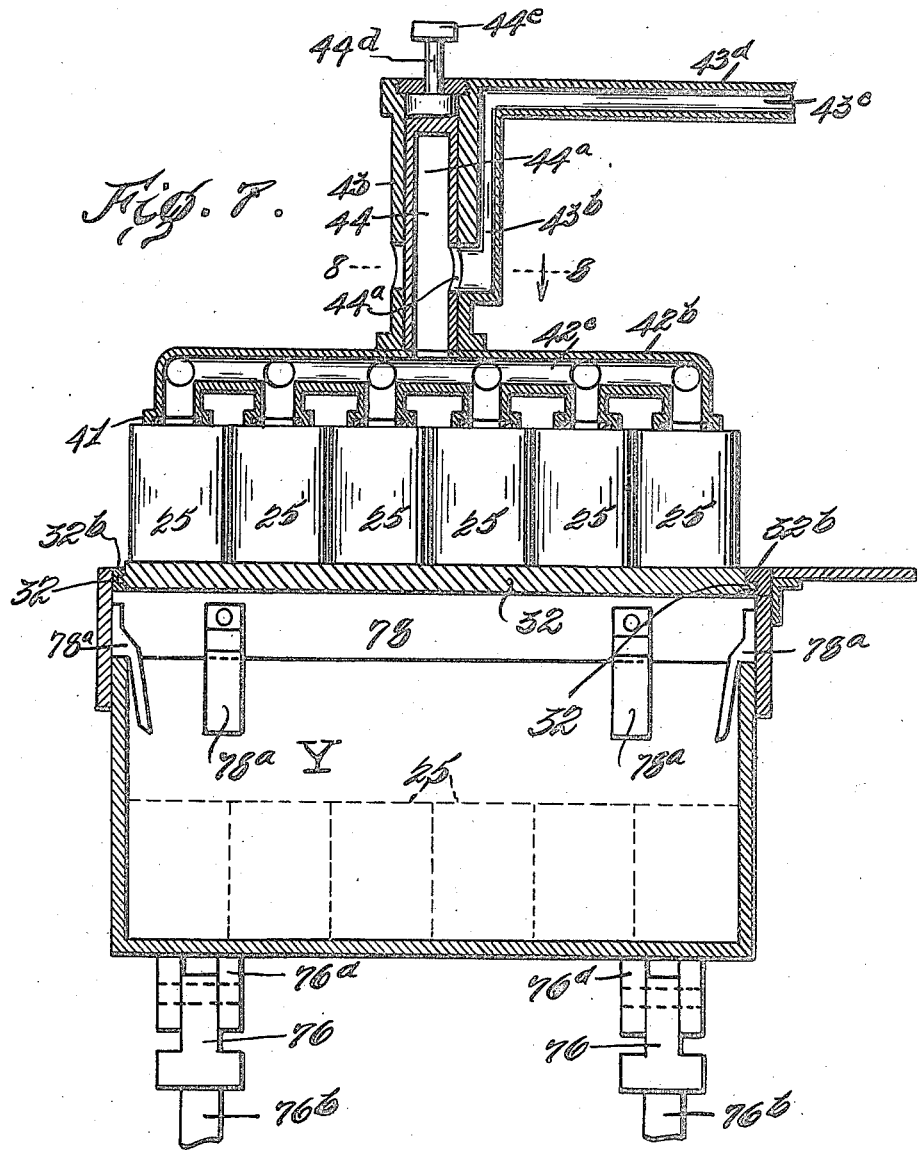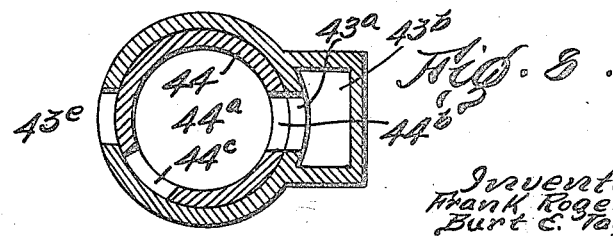

F. ROGERS & B. E. TAYLOR.
BOX LOADING MACHINE.
APPLICATION FILED MAY 19, 1916.
1,247,722.
Patented Nov. 27, 1917.
9 SHEETS—SHEET 7.
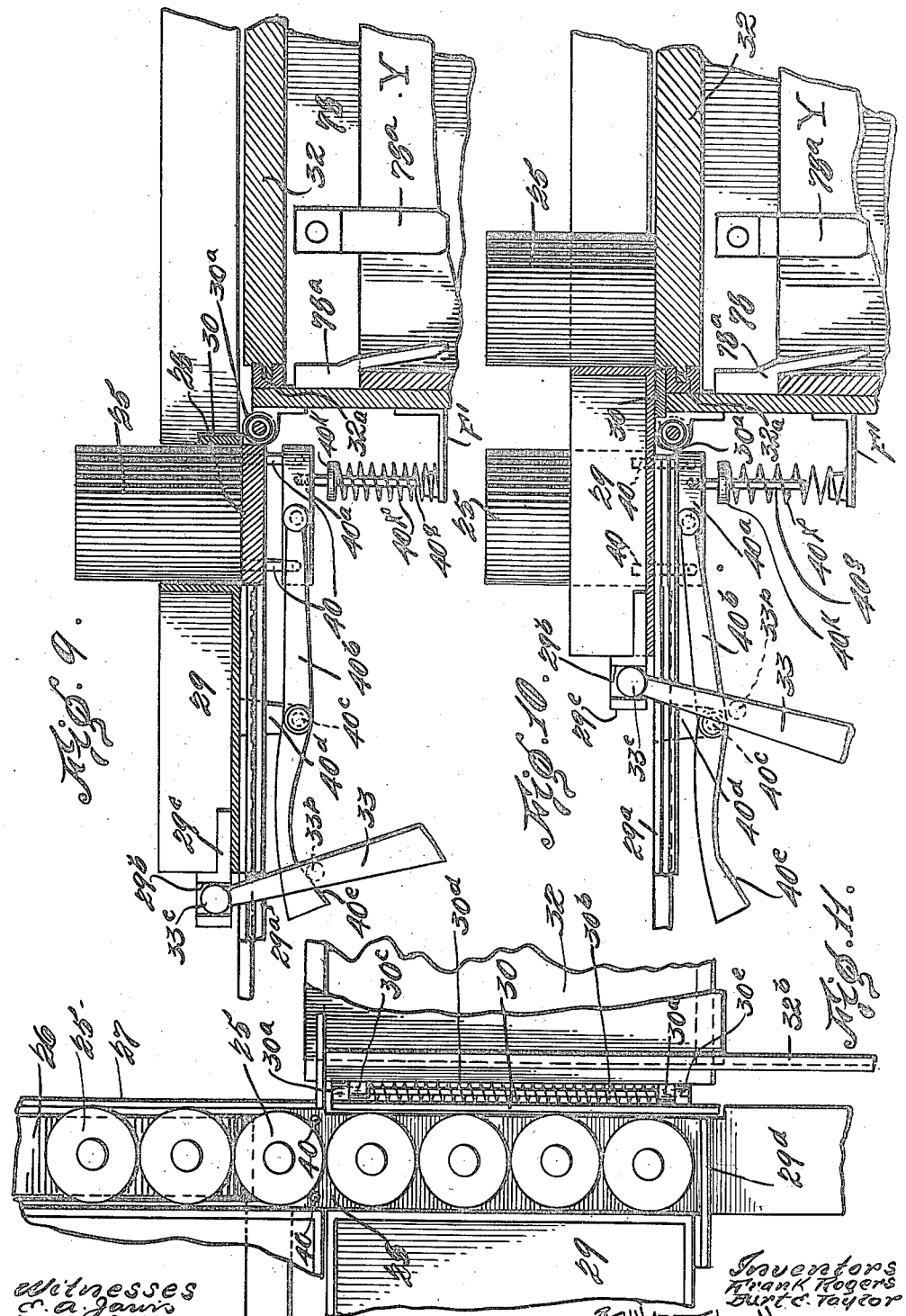

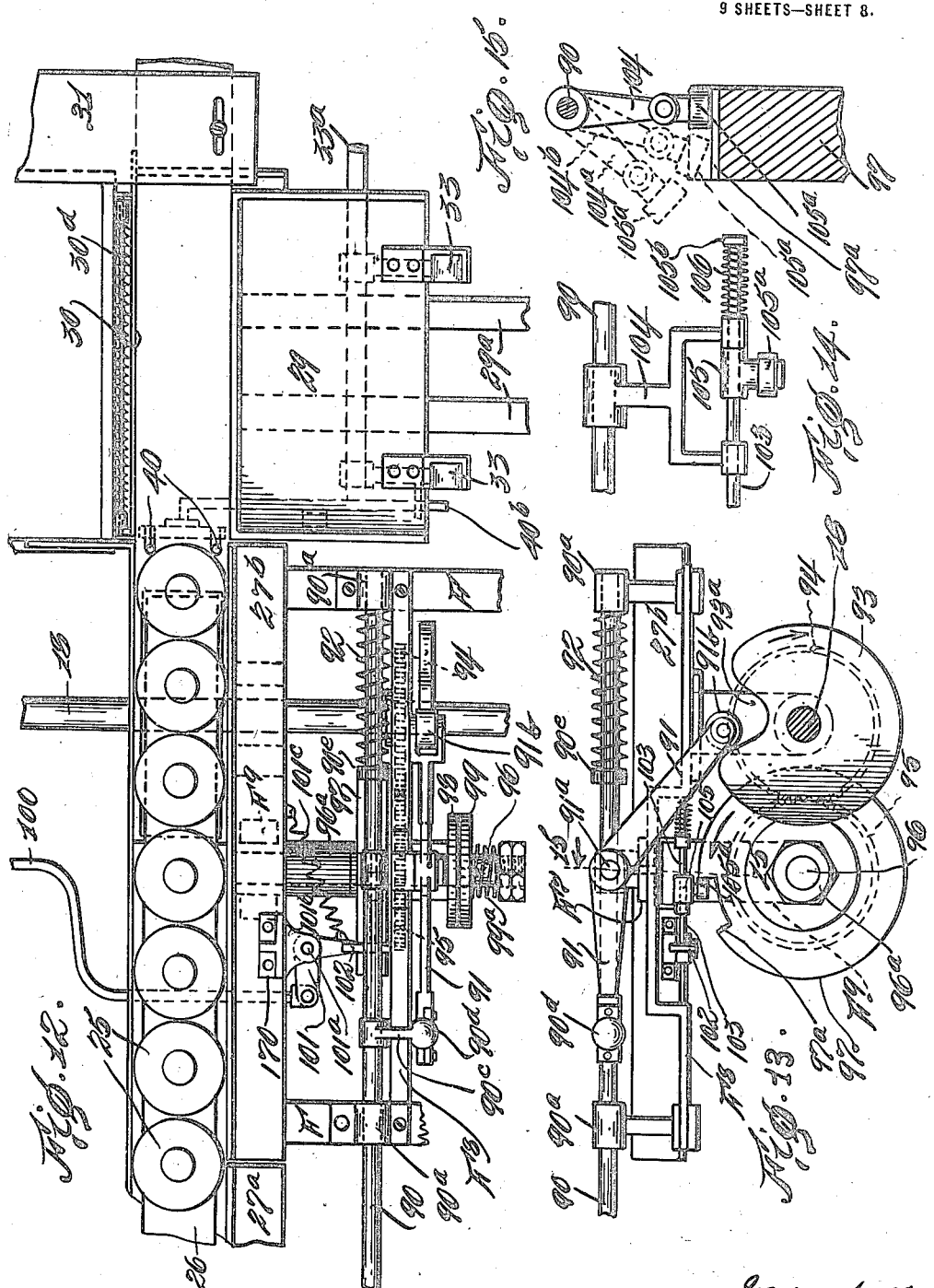

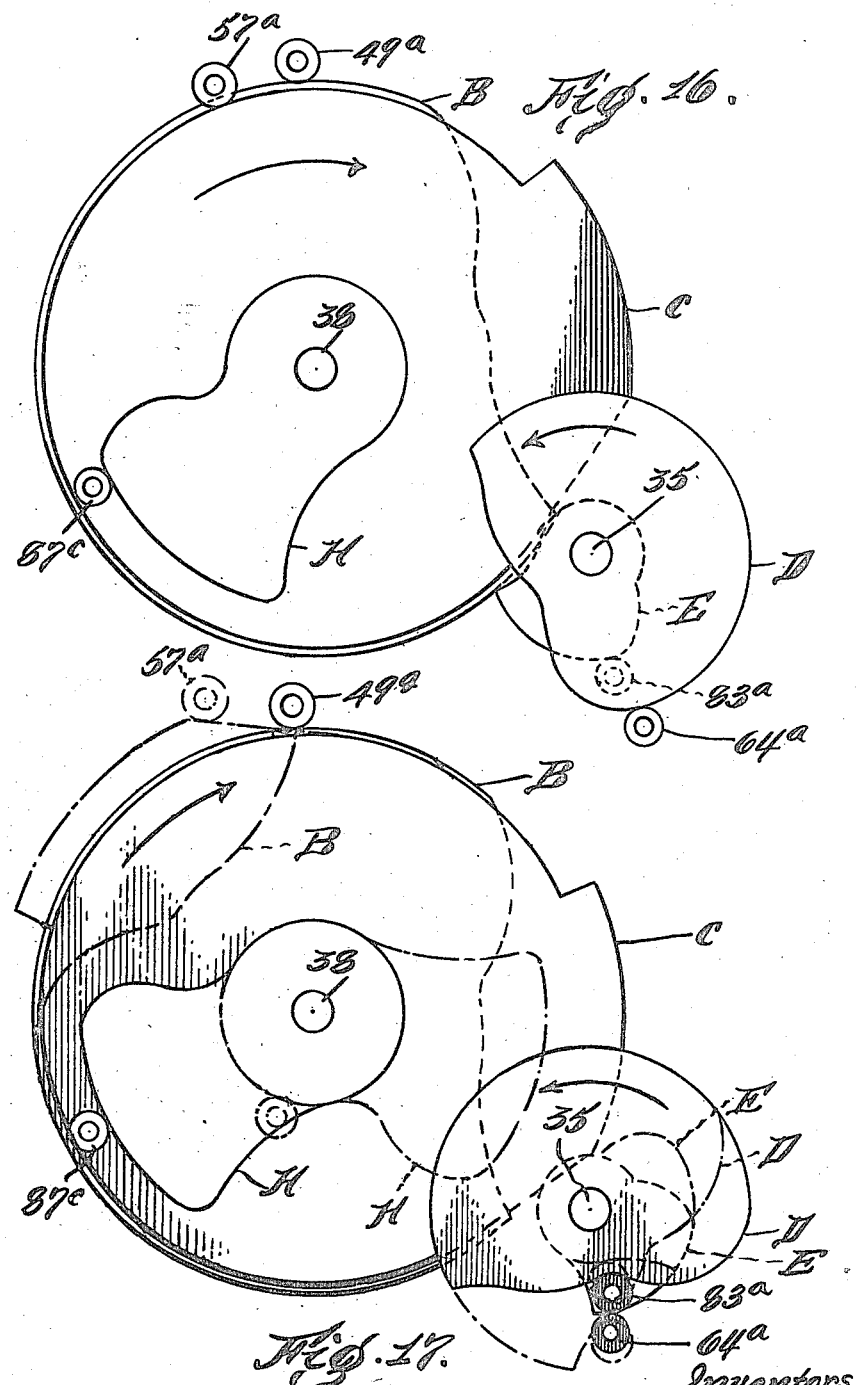

UNITED STATES PATENT OFFICE.

FRANK ROGERS, OF ORANGE, NEW JERSEY, AND BURT E. TAYLOR, OF NEW YORK, N. Y.

BOX-LOADING MACHINE.

1,247,722.    Specification of Letters Patent.    Patented Nov. 27, 1917.

Application filed May 19, 1916. Serial No. 98,578.

*To all whom it may concern:*

Be it known that we, FRANK ROGERS, a citizen of the United States, and a resident of Orange, in the county of Essex and State of New Jersey, and BURT E. TAYLOR, a citizen of the United States, and a resident of the city, county, and State of New York, have jointly invented a new and useful Box-Loading Machine, of which the following is a specification.

Our invention relates to machines for automatically loading, or packing into boxes or other containers, for storage or transportation, their full quotas, or loads, of alike packages, or load-units, of merchandise, or other articles.

The objects of our invention comprise provision of means, in an organized machine, whereby such packages, *i. e.* load-units, and simultaneously the boxes, may, without contact by the operator, be continuously, rapidly, accurately, and safely, moved, in the machine, from their respective sources of supply; each box, in turn, brought to a predetermined position in the machine; load-units symmetrically arranged in groups above, and registering with, the box in its said position, and thereinto inserted, in such groups, until the box has received its full quota of contents, after which it is, thus loaded, moved out of the machine, and these operations repeated indefinitely on other load-units and boxes.

We attain these objects by the mechanisms illustrated in the accompanying drawings, in which—

Figure 1 is a plan of our machine;

Fig. 2 is a side elevation, seen in the direction of the arrow in Fig. 1, the driving gears being omitted;

Fig. 3 is the same as Fig. 2, but showing said gears and omitting upper portions of the machine;

Fig. 4 is a detail plan view of the driving gear and controlling clutch shown in Fig. 3;

Fig. 5 is a central longitudinal section on line 5—5 of Fig. 6 seen in the direction of the arrow and omitting upper portions of the machine;

Fig. 6 is a cross-sectional view on the line 6—6 of Fig. 2, certain parts being omitted;

Fig. 7 is, on an enlarged scale, a sectional view of details, including a box and parts of the pneumatic devices for grasping the groups of load-units and aiding the suspension and lowering thereof into the box;

Fig. 8 is, on still more enlarged scale, a horizontal cross section on the line 8—8 of Fig. 7 showing the pneumatic control valve and its casing;

Fig. 9 is, on an enlarged scale, a diagrammatic view, partly in section, of the pusher and therewith associated elements, while the pusher is in its normal, retracted, position;

Fig. 10 is the same as Fig. 9, but showing the pusher in its advanced position at the end of its stroke;

Fig. 11 is, on an enlarged scale, a fragmentary plan of certain details, including the pusher and some of the therewith associated elements shown in Fig. 9;

Fig. 12 is, on an enlarged scale, a plan of details including parts of an automatic clutch device whereby operation of the machine is stopped while uncontrolled by the load-units;

Fig. 13, is a detail side elevation of elements contributing to the operation of the clutch mechanism, as shown in Fig. 12;

Fig. 14 is, on a more enlarged scale, a detail side view of some of the elements of the clutch mechanism shown in Fig. 13;

Fig. 15 is, on a still more enlarged scale, a diagrammatic view, partly in section, on line 15—15 of Fig. 13, to illustrate the action of some of the elements which coöperate to throw the clutch;

Fig. 16 is a diagrammatic view indicative of the movements, relations and timings of certain cams and their coöperative elements in the machine; and Fig. 17 is a view similar to Fig. 16 and further indicative of subjects therein shown.

Fig. 18 is an enlarged plan of one of the can-controlled levers.

Similar reference numerals, or letters, refer to similar parts in the drawings.

In those figures of our drawings showing extended portions, or the whole of our machine, we have not attempted to present the configuration of the cams indicated by dotted lines, as this might on the scale of the drawings, lead to confusion. We have therefore diagrammatically, separately, shown the cams in Figs. 16 and 17 on a larger scale.

Our machine is particularly useful in loading the well-known, rectangular type of packing boxes with cylindrical types of packages, as, for example, sealed metallic cans such as used to contain milk products, and diagrammatically indicated in the drawings.

Our machine comprises, as matter of course, a stationary frame, F, of any preferred form and material sufficient to requisitely support the operative devices. Such frame, and its components, will, we believe, be sufficiently understood, without further explanation, from the partly diagrammatic indications of parts thereof contained in the drawings.

The main shaft 18, carrying, adjacent one of its ends, the customary fast pulley 19, and loose pulley 20, (Fig. 1) is constantly actuated by aid of the usual belt and other appliances not shown.

Adjacent the other end of the main shaft it caries, loosely mounted thereon, a driving gear 21.

A friction clutch mechanism 22 (Fig. 4), of any preferred type, as employed to operatively connect the gear 21 with the shaft 18, the clutch being actuated, as hereinafter described, by aid of the vibratable two-armed lever $22^a$, pivoted at $22^b$ to a bracket $F^x$ carried by one of the constituents of the frame F of the machine (Fig. 4). Power, for purposes hereinafter described, is transmitted from the driving gear 21 by aid of the intermeshed train of idler gears 23 and 24.

The load-units, in this instance alike, cylindrical, cans, 25, are from any source of supply, in any convenient manner, placed upright on the usual type of endless feed belt 26 (Figs. 1 and 5, etc.) supported so as to travel constantly in the direction of the arrows (Fig. 5) by means of the driving pulley $26^a$, carried by the main-shaft 18 and a usual idler pulley, not shown.

Vertically disposed lateral guide members 27, $27^a$, $27^b$, adjacent each side of the belt, bound, in combination therewith, a runway for the cans. The feed of the cans, in the runway, by the belt is yielding in the respect that the belt slides under them in proportion to their progress being obstructed.

The runway opens onto a, therewith flush, stationary platform 28, adapted to support simultaneously a plurality of cans, in this instance four, as shown in Fig. 1.

Normally bounding the platform 28, in alinement with the guides $27^a$, $27^b$, is an element, or "pusher," 29, adapted to contact simultaneously a plurality of cans, and horizontally advanceable over the platform transversely of the direction of the runway, as hereinafter described.

Normally bounding the platform in alinement with the guide 27 is a normally vertically disposed plate 30 deflectable, as hereinafter described, whenever the pusher is advanced.

An adjustable guide plate 31 (Figs. 1 and 5) is, in part, disposed transversely of the pusher and deflectable plate so as to limit, or check, the advance between them of cans fed from the runway onto the platform by aid of the belt. It follows that when the parts are related as shown in Fig. 1, the cans riding on the belt will, by reason of their comparative inertia, shove onto the platform four of their predecessors in contact with each other so as to thereby completely fill can-standing room on the platform, and that said four cans are thus symmetrically grouped in a single rank on the platform.

Adjacent to, and flush with, the platform, on that side thereof nearest the deflectable plate 30, is a movable support, or table, 32, disposed to receive the cans thereonto pushed by the member 29. Means, hereafter described, are provided to move this table as required.

The guide plate 31 bounds one side of the table, and on two other sides thereof are similar, adjustable, guide plates $27^c$ $27^d$ (Fig. 1). These guide plates afford means whereby, by aid of the pusher, the cans, being alike in size and proportions, are alined on the platform in a symmetrical group, consisting of, in this instance, twenty-four units, the location of which group is thus also predetermined.

To actuate the pusher 29 which is slidably supported, and guided by the stationary bars $29^a$ we provide a pair of levers 33, carried by a rock-shaft $33^a$, journaled in alike brackets $33^z$ (one only shown) carried by a stationary part of the frame of the machine. The free ends $33^c$ are movably engaged in recesses $29^b$ of brackets $29^c$ carried by the pusher 29 (Figs. 1, 9, 10). The rock-shaft $33^a$ also carries an arm $33^d$ the free end of which is connected by a retractile spring $33^f$ with the frame of the machine. The shaft $33^a$ carries also another arm $33^m$, the free end of which carries a roller $33^o$, which rides on the periphery of a disk cam A, carried by a driven shaft 35 journaled in bearings $35^a$ carried by the frame of the machine. The shaft 35 carries a gear 36 (Figs. 3 and 6) meshed with a gear 37 carried by a counter shaft 38, journaled in bearings $38^a$ carried by said frame. The counter shaft 38 also carries another gear 39 which meshes with the before referred to idler gear 24 (Figs. 3 and 4).

The operative face of the cam A is shaped so as to permit the spring $33^f$ to retract intermittently, whereby the pusher is at the times required, correspondingly yieldingly advanced over the platform 28, and to alternately, against the stress of said spring, positively force the pusher back to its normal position.

We provide means to insure deflection of the plate 30 when the pusher is thus yieldingly advanced and to restore the plate to its normal position when the pusher is alternately forced back by the cam action. The plate carries ears 30ª 30ª (Figs. 9, 10, and 11) revolubly encircling a therethrough passing stationary rod 30ᵇ carried by brackets 30ᶜ 30ᶜ carried by the frame of the machine. A helical torsional spring 30ᵈ encircles the rod and connects it with the ears. The pusher 29 may also be provided with a thereby carried, therefrom horizontally projecting, push-bar 29ᵈ (Fig. 11) having its free end disposed to contact with the plate 30 and aid in its deflection when the pusher is advanced.

We provide means to stop, positively, as the pusher is advanced, the advance of the foremost can, and thus of its followers constantly impelled by belt 26, in their runway. These means comprise vertically movable stop-pins 40 (Figs. 9, 10, and 11) held normally below the level of the platform 28 (Fig. 9) adjacent the belt 26, and slidable, through therewith corresponding apertures in said platform, to the position indicated by dotted lines in Fig. 10. The stop-pins 40 are carried by a vertically movable block 40ª, carried by one end of a lever 40ᵇ, rockably pivoted at 40ᶜ to a bracket 40ᵈ, carried by the frame of the machine. The opposite, or inner, end of said lever is provided with a cam edge 40ᵉ which, when the levers 33, which actuate the pusher 29, are in their normal position, engages a pin 33ᵖ, whereby the stop-pins 40 are normally locked down, to their normal level below the runway, against the stress of an expansile spiral spring 40ᶠ encircling a pin 40ᵍ, carried by the block 40ª and bearing against a therewith connected stop 40ᵏ, carried by said pin, and also against a bracket F' (Figs. 9 and 10), carried by the frame of the machine. As the levers 33 advance, the thereby carried pin 33ᵖ correspondingly relaxes, and finally releases, its engagement with the cam edge 40ᵉ thus enabling the stop-pins 40 to slide upward through the platform 28 into the path of the can-runway under the constant stress of the spring 40ᶠ.

It follows from the foregoing constructions that one forward movement of the pusher 29 will impel the row of cans therewith contacting, in this instance consisting of four units, against the plate 30, which is by resulting advance of the cans and push-bar 29ᵈ deflected until flush with the platform 28, and the table 32, in the position shown in Fig. 10, thereby enabling the pusher to yieldingly shove the row of cans 25 onto the table 32 clear of the plate 30 into the position shown in that figure. This done the pusher is returned, the plate 30 rises, and the stop-pins 40 are retracted, all to their respective normal positions, and another row of four cans fed and alined as before on the platform 28. These are similarly shoved, by the next advance of the pusher, against the row of their predecessors on the table, which latter are thereby still further advanced on the table, and this cycle of movements repeated until the table's full quota of cans, in this instance twenty-four, is thereon delivered, and alined with each other in a symmetrical group by aid of the guides before referred to.

We provide means to grasp, support independently of the table, and subsequently completely suspend, and lower, simultaneously all the units of said group without disturbing their said alinement. To these ends we prefer to employ pneumatic means, though others might be used without departing from our invention.

Disposed normally above the movable table 32 is a group of simultaneously vertically movable pneumatic suckers 41, each unit of which is in central alinement with a can, or unit of the load, on the table.

These suckers, constituting part of our can-gripping and suspending device, are carried downwardly presented, by a frame, or drop member, 42 (Figs. 1, 2, 6, and 7) composed in this instance, of parallel horizontal ribs 42ª united with a thereto medially transverse spine 42ᵇ. Pneumatic passages 42ᶜ extending from each sucker through the ribs communicate in common with an air passage in the spine. The frame 42 carries medially a cylindrical casing 43 containing a therein horizontally rotatable valve 44 having a chamber 44ª communicating with the passages 42ᶜ, an exhaust port 44ᵇ, and an inlet port 44ᶜ (Figs. 7 and 8). The exhaust port is disposed to aline with a port 43ª, in the wall of the casing, communicating with a passage 43ᵇ, in the wall of the casing, which passage, in turn, communicates with a passage 43ᶜ in an arm 43ᵈ carried by the casing. The passage 43ᶜ is made to communicate by the usual flexible couplings (not shown) with any suitable exhaust or vacuum pump (not shown). In the wall of the casing 43 is another port, 43ᵉ (Fig. 8), which, when the valve is rotated so as to aline its port 44ᶜ therewith, admits air to the interior of the valve and its therewith connecting passage. The valve is rotated as required by aid of a thereby carried vertical spindle 44ᵈ (Fig. 7) carrying a horizontal arm 44ᵉ (Figs. 1 and 7) as hereinafter described.

The arm 43ᵈ, and thus the casing 43, is carried by a cross head 45 carrying rollers 45ª (Figs. 1 and 2) which travel in vertical guideways 46ª (Fig. 2) recessed in posts 46. The crosshead is secured to the upper end of a vertically movable post 47 which is slidable in, and guided by a bearing 48 carried by a bracket 48ᵃ (Fig. 2) carried by a stationary part of the machine, to wit, one of the rails on which the box-carriage, hereinafter described, rolls.

Our can-gripping, and suspending, devices are, as a whole, maintained in, and raised to, their normal elevation, or level, above, the movable table 32, and over the cans, and, enabled, as required, to therefrom descend by aid of gravity as follows: The free end of a lever 49 engages a yoke 47ᵃ carried by the post 47 which carries the cross head 45. The opposite end of the lever 49 is oscillatably carried by a pivot 49ᵃ, carried by a stationary part of the frame of the machine. The lever 49 carries a roller 49ᵇ, (indicated by dotted lines in Fig. 6) which rides upon the operative edge of a cam disk B, carried by the counter-shaft 38. The cam is so shaped, and timed, as to maintain the grasping devices stationary above the cans while the latter are being moved and alined on the table 32 as above described, and thereafter to permit said devices to descend by aid of gravity until the suckers 41 contact the cans and are pressed firmly thereon by gravitation of the elements thus superimposed. We regulate the speed of this gravity descent of the parts, and also the weight thereby imposed on the cans, by combining with the grasping devices a counter-weight 50, in any convenient manner, as for example, in that indicated in Fig. 2, in which 50ᵃ, 50ᵃ are usual pulleys and 50ᵇ a thereby movably carried, flexible, connection between the counter-weight and the thereby influenced parts. This, controlled, gravity descent of the grasping and suspending devices is of great importance.

The valve 44 we operatively rotate as follows: A link 51 connects the arm 44ᵉ with an arm 52ᵃ carried by a horizontally rotative, vertical, shaft 52 which carries adjacent its lower end another arm 52ᵇ which, by means of a link 53, (Fig. 1) is oscillatably connected with a lever-arm 54 (Fig. 2), carried by a rock-shaft 55, journaled in a bearing F² carried by the frame F of the machine.

The rock shaft 55 carries an arm 56 the free end of which is connected by a retractile spring 56ᵃ with the frame F of the machine. It follows from the foregoing construction that the valve 44 is constantly spring-impelled toward its normal position in which the ports 44ᵇ and 43ᵃ are in alinement and the exhaust operative.

The rock shaft 55 carries also another arm 57, the free end of which carries a roller 57ᵃ (Fig. 6, and dotted lines Fig. 2) which rides on the operative edge of a cam C carried by the counter shaft 38. The cam is so shaped and timed as, by the aid of the foregoing construction, to rotate the valve 44 against the stress of the spring 56ᵃ and thus cause the parts 44ᶜ and 43ᵉ to aline with each other whenever required to break the exhaust and release the suckers 41 from the cans.

There extends, through our machine, a runway for the boxes Y. The horizontal portion of this runway is located below the level of the movable table 32. We provide means, as follows, whereby the boxes are, from a source of supply, moved through said runway. These comprise means whereby the empty boxes are advanced to a position underlying, and in register with, the group of cans, or other load-units, while the latter are being, as above described, moved onto, and symmetrically arranged on, the movable table 32. These means include a box-carrier consisting, in this instance, of a truck 58 (Figs. 5 and 6) comprising a platform 58ᵃ for the boxes and underneath-wheels 58ᵇ, rolling on horizontal tracks 59, disposed medially of the horizontal box runway, and carried by stationary elements of the frame of the machine. It is important that this box-carrier, or its box-supporting platform 58ᵃ, be, as shown in Fig. 6, of less width than the box thereby carried. The front of the platform 59ᵃ carries block 58ᶜ, the fronts of which are vertical and their rears inclined for purposes hereafter explained. The rear of the platform carries similar blocks 58ᵈ.

The normal position of the truck 58 is as shown in Fig. 3. It is, as required, intermittently advanced to a predetermined location, in the runway, underlying the movable table 32, there stopped, and therefrom alternately backed again to its normal position by the following means: One end of a link 60 is pivotally connected with a bracket 58ᵉ (Fig. 5) carried by the truck. The opposite end of said link is, likewise pivotally, connected with the free end of a lever arm 61 carried by a rock shaft 62, journaled in bearings 62ᵃ (Fig. 6) carried by brackets F⁴ carried by the frame of the machine. The lever 61 carries a stud 61ᵃ the free end of which is, by a retractile spring 63, tensionally connected with the frame at F³ (Fig. 5). It results from this construction that the truck is constantly spring-impelled to advance in the box runway. The truck is, however, stopped below the table 32, held there momentarily, returned to its normal position and there held, against the stress of said spring, as and when required by the action of a suitably shaped cam disk D against the operative periphery of which bears a roller 64ᵃ carried by an arm 64, carried by the rock shaft 62.

Each time that the box-carrier, or truck, is, as, aforesaid, restored to its normal position and there held by the action of the cam D, an empty box Y is loaded thereonto by the following means: A vertical runway, or chute, 65, through which the boxes are, in procession, slidable, extends from an overhead source of box supply (not shown) to a point proximate the machine from which its constituent guide-rails 65ª are curved as shown in Figs. 2 and 3 so as to direct a box, therethrough impelled by gravity, to slide out of the chute onto the truck 58, when the latter is in its normal position, and on which it thereafter rests in a position in which a portion thereof projects from, and overhangs, each side of the truck platform 58ª, as shown in Fig. 6. As the box falls in inclined presentation out of the chute its corner strikes the inclined rear faces of the forward blocks 58ᶜ of the carrier which serves to bounce it backward until brought up against the vertical faces of the rear blocks 58ᵈ. By these means requisite rectilineality and fore and aft location, of the box on the platform 58ª are promoted. The boxes in the vertical portion of the chute 65 mutually contact each other in a continuous stack. A movable stop, or latch, 65ᵇ, projects normally into the pathway of the boxes in the chute sufficiently to therein stop, and hold, against gravity, the lowermost of the boxes and thus the superimposed stack. Another stop, or latch, 65ᶜ is, below this, supported normally out of said pathway, but slidably movable thereinto. To move the latches as required, a plunger 70 (Fig. 2) is slidably mounted in a stationary part of the frame of the machine. The inner end of this plunger is disposed to be borne against by the truck 58 as it returns to, and is held in, its normal position. The outer, or opposite, end of the plunger is joined by a usual pin and slot connection with one arm of a bell crank lever 71, pivoted in a bracket 71ª, carried by the frame of the machine, which bracket also aids to support the lower curved portions of the lower guide rails 65ª of the chute (Fig. 2). The other arm of the lever 71 is pivotally joined with one end of a link 72ª, the opposite end of which is similarly joined with one arm of a three-armed bell-crank lever 72, pivotally supported on a stationary part of the machine. Another arm of this lever is joined by a pin and slot connection with the stop, or latch, 65ᶜ. The third arm of the lever 72 is pivotally joined with one end of a link 73, the opposite end of which is similarly joined with one arm of a bell crank-lever 74, pivoted on a bracket 74ª. The other arm of this lever is joined by a pin and slot connection with the upper stop, or latch, 65ᵇ. A retractile spring 75 connects the link 72ª with the bracket 71ª, as shown in Fig. 2. It follows from the foregoing construction that each time the truck is, with its thereby carried box, advanced, as hereinbefore described, from its normal position in the box runway, the plunger 70 is thereby released to project into the path of the truck under stress of the spring 75, which simultaneously causes the latch 65ᶜ to advance into the path of the boxes in the chute, and the latch 65ᵇ to retract from its normal position. This enables the stack of boxes to slide down in the chute until the lowermost unit is stopped by the latch 65ᶜ. When the truck returns to its normal position it forces back the plunger, thus reversing the last mentioned positions of the latches. This releases the lowermost box from the latch 65ᶜ, whereupon it slides down the curved portion of the chute and onto the truck, as before described. Slightly in advance of the withdrawal of the latch 65ᶜ, the latch 65ᵇ is returned to normal position where, as before, it stops the remainder of the stack of boxes from descending. A box is thus delivered onto the truck at each of its returns to normal position, and this is done while cans are being forwarded and arranged in symmetrical groups, as before described, and while a box is being filled with cans, as hereinafter shown. It will be noted that the curvature of the guide rails is such that a box while between the latches is tipped out of the vertical sufficiently to afford a space between it and the next above box, into which the latch 65ᵇ can, without obstruction, enter.

We provide means whereby the box is, before being loaded, sufficiently alined with the group of cans, or load-units, on the movable table 32, and whereby also the box is, as is preferable, approximated thereto before loading. These comprise a pair of mutually opposite, simultaneously vertically-movable, horizontally-extending, elevator members 76, 77 (Figs. 5 and 6) disposed in the box runway normally at a level below that of the box-carrier platform 58ª and one each side thereof, or so as to straddle it, when the box-carrier has been advanced to underneath the movable table 32; and the disposition of the elevators being also such that they normally underlie portions of the box which project, as hereinbefore noted, from the platform 58ª, when the box is in the position shown in Fig. 6, or indicated by dotted lines in Fig. 2, whereby is rendered possible the elevation of the box by the elevators from off the platform and thence to the position shown in Fig. 5.

We provide means whereby the box while, and when, elevated is guided into alinement with the symmetrically arranged group of cans and the overhead movable table 32. These comprise a stationary box-alining frame 78 (Figs. 5 and 6) having its box-receptive aperture downwardly presented, and proportioned to admit of the box-sliding thereinto while being, as aforesaid, elevated. The frame 78 is carried by stationary elements of the frame of the machine. A plurality of alining fingers 78ª are carried by the frame 78, disposed to extend therefrom downwardly inclined toward the interior of the box. The inwardly inclined, or beveled, surfaces of these fingers contact with the top edges of the box as it rises and guide it toward proper register with the frame 78. It will be noted that the fingers are so shaped, and disposed at such distances from the corners of the frame, and of the box, as to be out of the way of the cans, i. e. the fingers are positioned so as to project into the interspaces left open between mutually contiguous cylindrical cans as indicated in Fig. 1.

Means are provided to reduce friction between the boxes and the box-bearing surfaces of the elevators. Such means are, in the present instance, indicated by antifriction rollers 76ª 77ª carried by the respective elevators.

The elevators 76 and 77 are respectively carried by movable posts 76ᵇ, 77ᵇ, respectively, vertically-slidably supported in bearings carried by the tracks 59 (Figs. 5 and 6).

The elevators 76 and 77 are, as often as, and when, required, moved vertically upward and intermittently returned to, and held in, their aforesaid normal position, by the following means, viz: Each post 76ᵇ and 77ᵇ, carries respectively a yoke, 76ᵈ and 77ᵈ, (Figs. 2 and 6). With each of said yokes engages a lever arm 79, carried by a rock shaft 80, journaled in bearings 80ª, carried by the brackets F⁴ (Figs. 5 and 6) carried in the frame of the machine.

The rock shaft 80 also carries an arm 81, of which the free end is connected by a retractile spring 82 with a bracket F⁵ (Figs. 2 and 5) carried by the frame of the machine. It follows that whenever said spring is free to retract, the elevators and thereby carried box will be yieldingly raised. To force the elevators down to their normal position and to hold them there, as, and when, required, we provide a correspondingly shaped and timed cam E, carried by the shaft 35. The periphery of this cam E bears operatively against a roller 83ª (Fig. 2) carried by a short arm 83 (Fig. 2), carried by the rock shaft 80. It follows that the cam being shaped and timed as required will, at intervals, force down the elevators to normal position against the stress of the spring 82 and hold them there during an interval after which the tension of the spring will again cause the elevators to yieldingly rise, and so on indefinitely. Throughout the remainder of the box-runway extending from the elevators to its outlet, we provide, for the loaded boxes, a floor 84 (Figs. 1 and 2), flush with the elevators when they are normally disposed.

This floor comprises, preferably, means for reducing friction between it and the boxes, as for example, in the present instance, its box-contacting surface consists of anti-friction rollers 84ª, disposed transversely of the path of the boxes, and rotatably carried by pins 84ᵇ, carried by frame members 84ᶜ, carried by elements of the frame of the machine (Figs. 1 and 2). It follows that after a box carried by the elevators has been loaded, as hereinafter described, and the elevators returned therewith to their normal position, a relatively moderate exercise of power is sufficient to push the loaded box off of the elevators onto the floor and the entire manually contacting sequence of such boxes to the outlet of the runway.

The support, i. e. the table 32 is, after the thereon group of cans has been grasped, as hereinbefore stated, moved horizontally outwardly from its normal position thereunder, and thereafter returned to that position, by the followinw means: The table is provided on two opposite sides with longitudinal lateral flanges 32ª (Figs. 9, 10 and 11) and is horizontally slidably supported by two parallel members, or guides, 32ᵇ, carried by stationary constitutents of the frame of the machine, and containing longitudinally extending grooves in which the flanges 32ª are slidably supported. One end of each of two, alike, links, 85, 85, (Figs. 1 and 5) is, by a pivotal connection 85ª, united with the table (Fig. 5). The opposite end of each of said links is, by a pivotal connection 85ᵇ joined with the free end of one of two alike lever-arms 86, carried by a rock-shaft 87, journaled in brackets F⁶, carried by the frame of the machine. The rock-shaft 87 carries a short arm 87ª, the free end of which is connected with the frame of the machine by a rectractile spring 88. It follows that the table 32 is constantly yieldingly impelled toward its normal position, under the can-grasping devices and one side the stationary platform 28, by the stress of said spring. To intermittently, horizontally, move or slide the table away from its normal position so as to then lower the grasped cans into the box beneath them as hereinafter described, the rock-shaft 87 carries another arm 87ᵇ, the free end of which carries a roller 87ᶜ (Fig. 3) upon which bears the operative edge of a cam H carried by the shaft 38 and shaped and timed to engage said roller and thus, against the stress of the spring 38, move the table 32 and hold it out of its normal position, as and when required.

One of the notable features of our machine is, as follows from the foregoing construction, that the cans, or load-units, are in all stages yieldingly moved, or impelled, and likewise the box-carrier, the therefrom elevated boxes, and the filled boxes. Thus, we have discovered, are secured, otherwise unattainable, advantages in operation, and in the results of automatic handling of the cans, and the loading therewith of the boxes.

Another important feature is the provision made whereby operation of the above described can, and box, manipulating agencies is automatically suspended during interruptions in the continuity of the supply of cans.

This we accomplish by means whereby the continuity of operation of the said agencies, and of the machine as a whole, is dependent on, or controlled by, the cans themselves, i. e. by the presence of cans in the can runway in numbers and contiguity such as to enable the loading to proceed without skips, or omissions.

Such means are, for example, in the present instance as follows: Inasmuch as the one driving shaft of the machine supplies all the power required for the operation of all of the numerous instrumentalities which cooperate with each other to produce the result for which the machine was invented, it suffices, and is preferable, that the can-control mentioned should be exercised directly upon transmission of power from such shaft, i. e. that means be provided whereby such transmission shall continue only when, and so long as, cans are being regularly and normally fed to the machine in such numbers and contiguity to each other as to supply, before each of the advances of the pusher 29, the full quota of cans, in this instance four, for which standing room is provided on the stationary platform 28.

We accordingly employ a friction clutch mechanism 22, above referred to, which may be of any suitable, well known, type, and this we so disposition and connect with the cans in the can runway, that the clutch will operatively connect the gear 21 with the driving shaft 18 only when cans are in transit through a predetermined space in the can runway, equal in length to the sum of the diameters of four of the cans, or load-units, whereas the absence of a can in said space will result in the automatic stopping of the machine, until the clutch is again connected by the advance of a can into said space.

Though the types of clutches referred to are familiar, it may be remarked that the one indicated in our drawings (Fig. 4) comprises a hollow disk $22^c$ carried by the, normally loose, gear 21, within which disk is carried, by the shaft 18, an ordinary thereby constantly rotated member $18^a$, carrying, in this instance, a therein pivoted plurality of two armed rock-levers, $22^d$, the free end of the inner arm, of each of which is cam-shaped so as to be rockable into, and out of, frictional engagement with the interior surface of the disk $22^c$. The shaft 18 also carries, keyed thereto, a thereon slidable wedge member $22^e$ having, a conical portion disposed constantly between, and in contact with, the outer ends of the levers $22^d$. The conical wedge $22^e$ contains an annular groove $22^f$ into which project, slidably, pins $22^g$ carried by a yoke $22^m$ (Fig. 3), carried by the one end of the lever $22^a$. It follows that when the lever $22^a$ is rocked on its pivot $22^b$ so as to force the wedge $22^e$ toward the disk $22^c$, the cams referred to will frictionally engage the interior surface of the disk $22^c$, thereby operatively connecting the shaft 18 with the gear 21.

That end of the lever $22^a$ which carries the pins $22^g$ is, by the cans in their runway, caused to approach the disk $22^c$ sufficiently to close the clutch by, in the present instance, the following means, viz: A plurality of alike bell-crank levers 89 (Figs. 1 and 18), in this instance four, one arm of each of which carries a longitudinally extended can-contactible finger surface $89^a$ alinable with the can-runway guide $27^a$, as shown in Figs. 1 and 18, are oscillatably mounted on pivots $89^b$ carried by a constituent part of said guide member. The opposite arms of the levers each carry a tail piece $89^c$ projecting angularly therefrom, and which, whenever a can in the runway is passing the finger portion $89^a$ of the lever, is disposed as shown in full lines in Fig. 18. (See also Fig. 1.) The arms of the levers carrying the tail pieces $89^c$ are connected by retractile springs $89^d$ with the stationary guide member $27^a$. It follows that, when there is, in the runway, no can to bear against any of their finger surfaces, the levers 89 will, unless restrained as hereinafter described, be, all of them, retracted, by their respective springs into the respective positions one of which is, indicated by dotted lines in Fig. 18. A shaft 90, oscillatable around its longitudinal axis, and disposed adjacent the said fingers, is journaled in suitable bearings $90^a$, carried by constituents of the frame of the machine (Figs. 1, 12, and 13). Said shaft carries a plurality of arms $90^b$, one for each of the levers 89, and disposed to bear against their tail pieces $89^c$ when the latter are in the positions shown by full lines in Figs. 1 and 18.

The shaft 90 also carries an arm $90^c$, the free end of which is universally jointed, as at $90^d$, with one end of a lever 91 oscillatably carried intermediate its ends, by a pivotal bearing $91^a$, carried by a bracket $F^7$ (Figs. 12 and 13) carried by a stationary part $F^8$ of the frame of the machine. A block $90^e$ carried by the shaft 90 is connected by a torsional spring 92, encircling the shaft, with one of the journal bearings $90^a$. The torque of the spring tends constantly to turn the shaft in a direction which will cause its arms $90^b$ to bear as aforesaid against the tail pieces of the levers 89 when they, by the presence of cans in the runway, are disposed in the positions shown in full lines in Figs. 1 and 18.

To turn the shaft in the opposite direction and against the stress of the spring 92, there is employed, in the present instance, a disk 93, carried by the driving shaft 18 and having a cam recess 93$^a$. A roller 91$^b$ carried by the lever 91 is disposed to ride on the periphery of said disk and to engage therewith in said recess as hereinafter described. The shaft 18 also carries a gear 94, which meshes with a gear 95, loosely mounted on a counter shaft 96, journaled in a bearing 96$^a$ supported by brackets such as F$^9$ (Figs. 12 and 13), carried dependingly by stationary constituents of the frame of the machine, such, for example, as the base of the guide 27$^b$ (Fig. 12). The countershaft 96 also carries, rotated therewith, a disk 97 having on its periphery a slot, or cut out portion, 97$^a$. The hub of the gear 95 carries one of the elements, 98, of an ordinary friction clutch of the disk type, the other element of which, 99, is keyed upon the counter-shaft 96 with which it rotates, but it is longitudinally slidable thereon. The element 99 of the clutch is constantly pressed against the element 98 by an expansile spring 99$^a$ which encircles the shaft 96 and bears also against a nut 96$^a$ (Fig. 13) threaded upon said shaft.

It follows, from the foregoing construction, that the disk 97, normally, constantly rotates synchronously in unison with the disk 93, and that whenever the latter's peripheral slot, or cut-out portion, 93$^a$ reaches the roller 91$^b$ the stress of the spring 92 can force the roller downward in the slot out of which it will be forced, against such stress, by further rotation of the disk. The shaft 90 and its levers 90$^b$ are thus constantly oscillated, i. e. rocked toward the levers 89 by the spring 92 and alternately in the opposite direction by the disk 93.

The lever 22$^a$, of the friction clutch device 22, (Fig. 4) is oscillatably connected by a link 100 with one arm of a bell-crank lever 101 (Fig. 12) rockably carried by a pivot 101$^a$ carried by a bracket 101$^b$ carried by the can guide member 27$^b$. The other arm of the lever 101 is connected by a retractile spring 101$^c$ with a stationary part, in this instance the can guide member 27$^b$ (Fig. 12), whereby the friction clutch 22 is normally held open. The last mentioned arm of the lever 101 carries a pad 102, disposed in a path in which is horizontally reciprocatable, as hereinafter described, a rod 103, disposed above the disk 97 in alinement therewith and slidably carried by a bracket 104, carried and oscillated by the shaft 90. The rod 103 carries a block 105 carrying a roller 105$^a$. The rod and its roller are yieldingly held to their normal positions relatively to the other elements, as shown in Fig. 14, by an expansible spiral spring 106 which encircles the rod and bears against a thereby carried head 105 and against an arm of the bracket 104 which latter also limits the movement of the head 105, and so of the rod 103, toward the right as shown in Fig. 14.

It follows, as the parts are so shaped and their motions timed, that at each oscillation of the shaft 90 the roller 105$^a$ oscillates transversely of the disk 97 in a path that passes through the peripheral slot, or cut-out, in that disk.

Now, while the main shaft 18 is as aforesaid constantly rotating and there are no cans in their runway in contact with the finger surfaces 89$^a$ of the levers 89, the tail pieces 89$^c$ of said levers will be in the position indicated by dotted lines in Fig. 18, i. e. out of the path of oscillation of the arms 90$^b$ of the shaft 90. Therefore, the rock of the arms 90$^b$, and so the oscillation of the shaft 90, will not be limited by interception of said arms by the tail pieces, and therefore the stress of the spring 92 will cause the roller 91$^b$ to descend as far as it can go into the cam recess 93$^a$ of the disk 93. It follows that while cans are, as aforesaid, absent from their runway, the roller 105$^a$ will oscillate, or swing on, an arc so extended as to pass completely through the rotating cut-out 97$^a$ without being contacted by the disk 97, its position at the top of such swing being indicated by dotted lines as 104$^a$ in Fig. 15. When, on the other hand, cans advance in the runway they will contact and force back into the position indicated by dotted lines in Fig. 18 the tail pieces 89$^c$ of the levers 89. Therefore the said tail piece will intercept the arms 90$^b$ and correspondingly stop, or limit, the oscillation of the shaft 90 and thus the swing of the roller 105$^a$ which will, in that case, not exceed the position indicated by the dotted lines 104$^b$ in Fig. 15. Such being the case the disk 97 will engage the roller, and thereby force it and the rod 103 toward the left as indicated in Fig. 13, whereby the end of the rod will be forced against the pad 102 thereby rocking the bell-crank lever 101, against the stress of the spring 101$^c$ and thus, through the link 100, closing the friction clutch device 22 and transmitting power from the main shaft 18 to the gear 21, and so on to intermittently, positively actuate, as required for their spring tensioned operation, all the above described elements of the machine which coöperate in the automatic loading of the cans into the boxes.

Thus is the operation of the said elements controlled by the cans in their runway, and defective loading consequently prevented.

We believe that those skilled in the art will from the foregoing description of our invention understand how to shape and time the various cams employed by us, as this is a matter of mechanical experience and skill, but for a clearer understanding we have, in Figs. 16 and 17 diagrammatically indicated, with such approximate exactness as possible in a patent drawing, the various shapes of the cams and their relations to each other and thereby actuated elements, which we believe will be readily understood by mechanics without additional elaboration.

The operation of our machine comprises the following features: The main shaft being constantly rotated, the cans, or other load-units, are fed, by hand, or otherwise, into the belt 26 by which they are carried in single file through their runway, in which, while passing, they bear against the finger surfaces $89^a$ of the lever 89 sufficiently to close the friction clutch 22, as above described, and thereby enable said main shaft to transmit power to the other mutually-coacting elements of the machine. The aggregate, inertia, and momentum of the more numerous cans on the belt, though riding slidingly thereon, force the relatively few cans ahead of them onto the stationary platform 28 until the latter is filled with its quota, in this instance four, which then stand alined, and in contact with each other, in a single rank in line with their followers on the belt. This done the meanwhile continuous rotation of the cam A releases the pusher which is then yieldingly advanced, by stress of the spring $33^t$, transversely of the platform, whereby the plate 30 is deflected, the stop pins 40 raised into the path of the cans in their runway, and the first rank of cans pushed onto the movable table 32. This done further rotation of the cam A operates to retract the pusher, and so the pins to their normal position, while the plate 30 is simultaneously returned to its normal position by the spring $30^d$ and the platform made ready for the next rank of four cans which is thereto transferred to be similarly pushed onto the table 32 into contact with the first rank which it pushes farther onto the table before it, and these operations are repeated until the platform receives its full quota of cans, in this instance twenty four, which are thus, and by aid of the guides $27^c$, $27^d$, and 31, marshaled in a symmetrical group.

As soon as the group has thus been made ready the now continuously rotating cam disk B, being so shaped and timed, permits gravity, suitably restrained by the counter-weight 50, to gently lower the grasping devices until they rest upon the cans with sufficient pressure to insure effective grasp thereof i. e. adhesion thereto, by the pneumatic suckers 41 the exhaust of which is now constantly operating. At this stage the cans become dependently supported by the pneumatic grasping devices.

While the above described operations have been proceeding, the therewith simultaneously rotating cam disk D, being so shaped and timed, has forced backward in the box runway the box carrier, or truck, 58, until pressure therefrom has operated, as before described, to release an empty box in the box chute, which, while the truck is there held by the cam, drops therefrom by gravity at an angle such that a longitudinal corner of the box strikes first the inclined surface of the forward block $58^c$, carried by the platform $58^a$ of the truck, the result being that the box settles finally on the platform plumb against the surface of the rear block $58^d$ which is at right angles with the platform, the required fore and aft location of the box on the platform being thus assured.

Continued rotation of the cam D releases the truck to be impelled afterward in the box runway, by stress of the spring 63, until it arrives at a location below the group of cans on the table 32, where the continued rotation of the cam D again stops the truck and for an interval holds it stationary against the stress of said spring.

During this interval, and while the mustering of the group of cans on the table 32 is proceeding as above described, the retractile spring 82, is permitted by the continuously occurring rotation of the cam E, so shaped and timed, to raise the elevators 76 and 77 which, encountering in their movement the superimposed portions of the box in excess of the width of the truck, lift the box on them into the alining frame 78 until further rise is stopped, and the elevators and box, are during an interval, there maintained stationary by action of the cam E, it being also notable that as the box thus rises its inner vertically disposed surfaces thereof are borne against by the alining fingers $78^a$ which thus contribute to its required register.

During this last mentioned interval the continuous rotation of the cam 4, so shaped and timed, serves to force back the table against the stress of the spring 88 from under the group of cans which becomes then actually suspended as aforesaid by the grasping devices, which, now carrying the cans, are, by the shape and timing of the cam B, permitted to continue their restrained gravity descent until the cans enter and bear upon the bottom of the box, whereupon the continuous rotation of the cam C, so shaped and timed, serves to rotate the valve 44 to break the exhaust whereby the cans in the box are released from the pneumatic suckers, whereupon continued rotation of the cam C serves to release the valve to the continuous stress of the spring $56^a$ whereby it is rotated back toward its normal position and suction of air therethrough resumed, when required.

At this stage the cam B proceeds to effect the lifting of the can-grasping devices, against gravity, through the now vacant path of the table 32 and back to their normal position above the latter where the cam assists in supporting them pending the installment, as before, of another group of cans on the table, which is, by continued rotation of the cam H, released to be impelled back to its normal position by stress of the spring 88, whereupon another group of cans is loaded thereonto by repetition of the operations therefor already described.

In the present instance illustrated in the drawings, the box Y, to be loaded, requires, for its full quota two therein superimposed groups, or tiers, of the cans, the cam E is therefore accordingly so shaped and timed as to maintain the box in its said can-receptive position until the two groups have been, by the aforesaid operations, loaded thereinto. It is here that the value of our gravity descent of the cans becomes apparent, inasmuch as though the second descent of the can-grasping instrumentalities is necessarily shorter than the first, the action of the cam D is, without detriment, the same in both instances, and the only difference in operation is that at the second descent the exhaust continues somewhat longer after the upper tier of cans have come to rest than it does after the lower tier have done so. We believe that it would be difficult, if not impossible, to satisfactorily conduct this lowering of cans, under the circumstances, by any positively acting mechanical means.

The box having, as above described, been loaded with its full quota of cans, the further rotation of the cam E serves to force down the elevators against the stress of the spring 88 to their normal position at which, as hereinbefore noted, their tops, on which the box rests, are below the level of the box-carrier platform 58ª of the truck 58. In this position, the cam E serves to retain the elevators and the thereby carried box, until the next advance of the truck toward its position under the table 32. During this advance the platform 58ª, or the vertical front surfaces of the forward blocks 58ᶜ carried by the platform bear against the said box and push it before them off of the elevators onto the floor of the remainder of the box runway, where it remains until the next loaded box is similarly pushed off the elevators against it, whereby it is itself pushed farther toward the delivery end of the runway and so on, the cycle of the aforesaid operations being indefinitely repeated, unless interrupted by shortage of feed of the cans in their runway when all the aforesaid cams or other instrumentalities, to which required power is supplied from the main shaft are immediately disconnected therefrom by appropriate means, such, for example, as have been above described. The operation of the machine then stops until the main shaft has again been operatively connected with said means by the presence and influence thereon of a can in the runway.

Another notable advantage attributable to our invention is that thereby, as will be apparent from the foregoing, all impulses imparted to the cans, or load-units, and to the boxes, are of a yielding nature, i. e. not absolutely positive.

The belt 26 carries the cans slidably thereon; the boxes are impelled in, and from, their chute onto the truck platform 58ª by gravity solely; the cans are lowered into the box by action of gravity suitably restrained. All other movements imparted to the cans and boxes are caused by spring action. We have thus we believe, rendered it impossible for any injurious jam to occur during operation.

It should also be noted that our construction is such that the objects of the machine, i. e. the, thereto indispensable, respective movements of cans and empty boxes, from their different sources of supply, in such manner, without contact by operators, as to result in continuous loading of the cans in the symmetrical groupings required to fill the boxes to the uttermost, and the delivery of the thus, as completely as possible, filled boxes, are attained by instrumentalities all of which are simultaneously, during the attainment of the joint result, constantly coacting with each other and are actuated through a single power-shaft to produce such result.

The omission of any one or more of our said instrumentalities from their aforesaid combination and coaction for attainment of our specified main purpose would, we believe, prove detrimental, if not prohibitive. Nevertheless certain features of our invention hereinafter specifically referred to in our claims might, we believe, prove individually useful even if segregated from our present combination and transferred to others.

Having now described our invention, what we claim as new and desire to secure by Letters Patent is the following, viz:

1. In combination in a box-loading machine, a runway for units of the load; a movable support for said load-units adjacent the delivery end of said runway; means to forward said units throughout said runway onto said support; means to arrest said forwarding means during deficiency of said units in said runway; means to symmetrically group said units on said support; a runway for boxes disposed beneath said support; means to advance in said runway an empty box until it is beneath said support; means to aline said box with said group of units so supported; means to suspend said group independently of said support; means to withdraw said support from the thereon units; means to lower the suspended units into the box; means to release them therein; and means to advance the loaded box through its runway.

2. In combination in a box-loading machine, a runway for units of the load; a movable support for said load-units adjacent the delivery end of said runway; means to yieldingly forward said units throughout said runway onto said support; means to arrest said forwarding means during deficiency of said units in said runway; means to symmetrically group said units on said support; a runway for boxes disposed beneath said support; means to advance in said runway an empty box until it is beneath said support; means to aline said box with said group of units so supported; means to suspend said group independently of said support; means to withdraw said support from the thereon units; means to lower the suspended units into the box; means to release them therein; and means to advance the loaded box through its runway.

3. In combination in a box-loading machine, a runway for units of the load; a movable support for said load-units adjacent the delivery end of said runway; means to forward said units throughout said runway onto said support; means to arrest said forwarding means during deficiency of said units in said runway; means to symmetrically group said units on said support; a runway for boxes disposed beneath said support; means to advance in said runway an empty box until it is beneath said support; means to move said box vertically; means to aline said box with said group of units so supported; means to suspend said group independently of said support; means to withdraw said support from the thereon units; means to lower the suspended units into the box; means to release them therein; and means to advance the loaded box through its runway.

4. In combination in a box-loading machine, a stationary platform; means to aline on said platform a plurality of like load-units; a movable support adjacent said platform; means to move said load-units simultaneously from said platform onto said support; and means to remove said support from beneath said load-units.

5. In combination in a box-loading machine, a stationary platform; means to aline on said platform a plurality of like load-units; a movable support adjacent said platform; yielding means to move said load-units simultaneously from said platform onto said support; and means to remove said support from beneath said load-units.

6. In combination in a box-loading machine, a stationary platform; means to aline on said platform a plurality of like load-units; a movable support adjacent said platform; means to move said load-units simultaneously from said platform onto said support; means to symmetrically group said load-units on said support; means to suspend said group independently of said support; means to remove said support from beneath said load-units; means to lower said suspended group; and means to release it.

7. In combination in a box-loading machine; a runway for units of the load; means to advance such load-units in said runway; a stationary platform adjacent said runway; means to aline on said platform a plurality of said units thereonto advanced; a movable support adjacent said platform; means arrestable by deficiency of said units in said runway to impel said advanced units, from said platform onto said support; and means to remove said support from beneath said last mentioned load-units.

8. In combination in a box-loading machine; a runway for units of the load; means to advance such load-units in said runway; a stationary platform adjacent said runway; means to aline on said platform a plurality of units thereonto advanced; a movable support adjacent said platform; means arrestable by deficiency of load-units in said runway to yieldingly impel said advanced load-units from said platform onto said support; and means to remove said support from beneath said last-mentioned load-units.

9. In combination in a box-loading machine; a stationary platform; means to aline on said platform a plurality of like load-units; a movable table adjacent one side of said platform; a horizontally movable pusher adjacent the opposite side of said platform adapted to contact simultaneously said load-units; and means to yieldingly impel said pusher over said platform.

10. In combination in a box-loading machine; a runway for units of the load; means to forward such load-units in said runway; a stationary platform adjacent said runway; means to aline on said platform a plurality of like load-units; a movable table adjacent one side of said platform; a horizontally movable pusher adjacent the opposite side of said platform adapted to contact simultaneously said load-units; and means arrestable by deficiency of load-units in their runway to yieldingly impel said pusher over said platform.

11. In combination in a box-loading machine, a runway for units of the load; means to normally constantly yieldingly forward such load-units in procession through said runway; a stationary platform adjacent the delivery end of said runway adapted to support a plurality of said units; a pusher normally bounding said platform in alinement with one side of said runway; a deflectable plate normally bounding said platform in alinement with the opposite side of said runway; means to limit the number of load-units advanced between said pusher and plate; means to impel said pusher over said platform in the direction of said plate; means to retract said pusher to its normal position; and means to restore said plate to normal position.

12. In combination in a box-loading machine, a runway for units of the load; means to normally constantly yieldingly forward such load-units in procession through said runway; a stationary platform adjacent the delivery end of said runway adapted to support a plurality of said units; a pusher normally bounding said platform in alinement with one side of said runway; a deflectable plate normally bounding said platform in alinement with the opposite side of said runway; means to limit the number of load units advanced between said pusher and plate; means to yieldingly impel said pusher over said platform in the direction of said plate; means to positively retract said pusher to its normal position; and means to yieldingly restore said plate to normal position.

13. In combination in a box-loading machine, a runway for units of the load; means to normally constantly yieldingly forward such load-units in procession through said runway; a stationary platform adjacent the delivery end of said runway adapted to support a plurality of said units; a pusher normally bounding said platform in alinement with one side of said runway; a deflectable plate normally bounding said platform in alinement with the opposite side of said runway; means to limit the number of load-units advanced between said pusher and plate; means arrestable by deficiency of load-units in their runway to impel said pusher over said platform in the direction of said plate; means to retract said pusher to its normal position; and means to restore said plate to its normal position.

14. In combination in a box-loading machine, a runway for units of the load; means to normally constantly yieldingly forward such load-units in procession through said runway; a stationary platform adjacent the delivery end of said runway adapted to support a plurality of said units; a pusher normally bounding said platform in alinement with one side of said runway; a deflectable plate normally bounding said platform in alinement with the opposite side of said runway; means to limit the number of load-units advanced between said pusher and plate; means to limit the advance of load-units in their runway while the pusher is moving; means to impel said pusher over said platform in the direction of said plate; means to restore said pusher to its normal position; and means to restore said plate to its normal position.

15. In combination in a machine for filling a box with like packages, a runway adapted to transmit the packages similarly positioned in single file; means to normally constantly slidably advance the packages in said runway; a stationary horizontal platform adjacent the delivery end of, and flush with, said runway; a pusher normally bounding said platform in alinement with one side of said runway; a deflectable plate normally bounding said platform in alinement with the opposite side of said runway; means bounding said platform transversely of said pusher and plate to stop advance between them from said runway of more than a given number of mutually contacting packages in single file; a movable table adjacent said deflectable plate and flush with said platform; means to impel said pusher across said platform toward said deflectable plate and table until the thereby impelled file of packages is transferred to said table; means to limit the advance of packages in their runway while the pusher is moving; means to restore said pusher to its normal position; means to restore said plate to its normal position; means to guide the packages into a symmetrical group on said table; means to simultaneously grasp the packages of said group and suspend them independently of said table; means to remove said table from beneath said group so grasped; means to meanwhile convey a box, of aperture corresponding with the dimensions of said group to a location beneath and in alinement therewith; means to support said box so positioned; means to lower the grasped and suspended group into the box; and means to release the group therein.

16. In combination in a machine for filling a box with like packages, a runway adapted to transmit the packages similarly positioned in single file; means to normally constantly slidably advance the packages in said runway; a stationary horizontal platform adjacent the delivery end of, and flush with, said runway; a pusher normally bounding said platform in alinement with one side of said runway; a deflectable plate normally bounding said platform in alinement with the opposite side of said runway; means bounding said platform transversely of said pusher and plate to stop advance between them from said runway of more than a given number of mutually contacting packages in single file; a movable table adjacent said deflectable plate and flush with said platform; means constantly spring-tensioned to impel said pusher across said platform toward said deflectable plate and table until the thereby pushed file of packages is transferred to said table; means to limit the advance of packages in their runway while the pusher is moving; means controlled by a package in the runway to positively restore said pusher to its normal position; means to guide the packages into a symmetrical group on said table; means intermittently spring-impelled to simultaneously grasp the packages of said group; means to suspend them so grasped independently of said table; means controlled by a package in said runway to remove said table from beneath said group so held; means to meanwhile convey a box of aperture corresponding with the horizontal dimensions of said group to a location beneath and in alinement therewith; means to support said box so positioned; means to lower the suspended group into the box; and means controlled by a package in the runway to release the group therein.

17. In combination in a machine for filling a box with like packages, a runway adapted to transmit the packages similarly positioned in single file; means to normally, constantly, slidably, advance the packages in said runway; a stationary horizontal platform adjacent the delivery end of, and flush with, said runway; a pusher normally bounding said platform in alinement with one side of said runway; a deflectable plate normally bounding said platform in alinement with the opposite side of said runway; means bounding said platform transversely of said pusher and plate to stop advance between them from said runway of more than a given number of mutually contacting packages in single file; a movable table adjacent said deflectable plate and flush with said platform; means to yieldingly impel said pusher across said platform toward said deflectable plate and table until the thereby pushed file of packages is transferred to said table; means to limit the advance of packages in their runway while the pusher is moving; means to restore said pusher to its normal position; means to restore said plate to its normal position; means to guide the packages into a symmetrical group on said table; means to simultaneously grasp the packages of said group and suspend them independently of said table; means to remove said table from beneath said group so grasped; means to meanwhile convey a box having an aperture corresponding with the dimensions of said group to a location beneath and in alinement therewith; means to support said box so positioned; means to lower the suspended group into the box; and means to release the group therein.

18. In combination in a machine for filling a box with like packages; a runway adapted to transmit the packages similarly positioned in single file; means to normally, constantly, slidingly advance the packages in said runway; a stationary horizontal platform adjacent the delivery end of, and flush with, said runway; a pusher normally bounding said platform in alinement with one side of said runway; a deflectable plate normally bounding said platform in alinement with the opposite side of said runway; means bounding said platform transversely of said pusher and plate to stop advance between them from said runway of more than a given number of mutually contacting packages in single file; a movable table adjacent said deflectable plate and flush with said platform; means to impel said pusher across said platform toward said deflectable plate and table until the thereby impelled file of packages is transferred to said table; means to limit the advance of packages in their runway while the pusher is moving; means to restore said pusher to its normal position; means to restore said plate to its normal position; means to guide the packages into a symmetrical group on said table; means to simultaneously grasp the packages of said group and suspend them independently of said table; means to remove said table from beneath said group so held; means to meanwhile convey a box having an aperture corresponding with the dimensions of said group to a location beneath and in alinement therewith; means to support said box so positioned; means to lower by aid of gravity the suspended group into the box; and means to release the group therein.

19. In combination in a box-loading machine; a runway for a box; a carrier for the box; means to propel the carrier; means to stop said carrier at a predetermined location in said runway; means to elevate the box off of said carrier; means to retract the carrier from beneath the box; means to guide the box while being elevated into alinement with a load above it; means to lower the load into the box; means to lower the box below its former level on said carrier; and means to advance the box through the remainder of the runway.

20. In combination in a box-loading machine; a runway for a box; a carrier for the box; means to yieldingly propel the carrier; means to stop said carrier at a predetermined location in said runway; means to elevate the box vertically off of said carrier; means to retract the carrier from beneath the box; means to guide the box, while being elevated, into alinement with a load above it; means to lower the load into the box; means to vertically lower the box below its former level on said carrier; and means to yieldingly advance the box through the remainder of the runway.

21. In combination in a box-loading machine; a horizontal runway for a box; a box-carrier of less width than the box; means to propel said carrier and thereby carried box in the runway; a pair of mutually opposite vertically movable elevators in the runway disposed to straddle the carrier and normally underlie therefrom-projecting portions of the box; means to stop the carrier when between the elevators; means to raise the elevators above the level of the carrier; means to retract the carrier from between the elevators; means to guide the box into alinement with a load above it; means to lower a load vertically into the box; means to lower the elevators to their normal level; and means to advance the box through the remainder of the runway at a level below that at which carried by the carrier.

22. In combination in a box-loading machine; a horizontal runway for a box; a box carrier of less width than the box; means to propel said carrier and thereby carried box in the runway; a pair of mutually opposite vertically movable elevators in the runway disposed to straddle the carrier and normally underlie therefrom projecting portions of the box; means to stop the carrier when between the elevators; means to raise the elevators above the level of the carrier; means to retract the carrier from between the elevators; means to lower the elevators to their normal level; and means to advance the box through the remainder of the runway at a level below that at which carried by the carrier.

23. In combination in a box-loading machine, a runway for a box; a box-carrier of less width than the box; means to propel said carrier and thereby carried box in the runway; a pair of mutually opposite vertically movable elevators in the runway disposed to straddle the carrier and normally underlie therefrom-projecting portions of the box; means to stop the carrier when between the elevators; means to raise the elevators above the level of the carrier; and means to retract the carrier from between the elevators.

24. In combination in a box-loading machine, a box-carrier of less width than the box; a pair of mutually opposite vertically movable elevators disposed to straddle the carrier and normally underlie therefrom-projecting portions of the box; means to move the carrier horizontally; means to stop it between the elevators; and means to move the elevators vertically.

25. In combination with a box-loading machine, a horizontal runway for a box; a box-carrier of less width than the box; means to propel said carrier and thereby carried box in the runway; a pair of mutually opposite vertically movable elevators disposed to straddle the carrier in the runway and normally underlie therefrom-projecting portions of the box; means to stop the carrier when between the elevators; means to raise the elevators above the level of the carrier; means to retract the carrier from between the elevators; means to lower the elevators to their normal level; and, a floor for the boxes extending from the elevators to the outlet of the runway and flush with the tops of the elevators at their normal level.

26. In combination in a box-loading machine; a runway for units of the load; means to forward such load-units in said runway; a movable support adjacent said runway; means to impel load-units onto said support; means to symmetrically group the load-units on said support; means to hold an empty box beneath said support; means to aline said box with said group of load-units so supported; means to suspend said group independently of said support; means to withdraw said support from the thereon units; means to lower the suspended load-units into the box; and means to release them therein.

27. In combination in a box-loading machine; a movable support for units of the load; means to impel load-units onto said support; means to symmetrically group the load-units on said support; means to hold an empty box in alinement with said group; means to suspend said group independently of said support; means to withdraw said support from the group; means to lower by aid of gravity the suspended group into the box; and means to therein release the group.

28. In a box-loading machine, a stationary horizontal platform; means to feed load-units upon said platform; means to aline load-units so fed on said platform; means to limit the number of load units so fed; a horizontally movable pusher normally disposed adjacent one side of said platform having a vertically disposed operative face adapted to contact simultaneously the load-units so alined on said platform; means to move said pusher over said platform; and means to retract said pusher to its normal position.

29. In combination in a box-loading machine, a stationary horizontal platform; means to place on said platform a plurality of like units of the load; a pusher normally bounding one side of said platform; a deflectable plate normally bounding the opposite side of said platform; means to move said pusher yieldingly transversely of said platform toward said plate; means comprising a rotary cam to intermittently retract said pusher to, and hold it in, its normal position; and means to restore said plate to its normal position.

30. In combination in a box-loading machine, a stationary horizontal platform, dimensioned to receive a plurality of units of the load; a therewith flush movable table normally adjacent one side of said platform; means to horizontally push said units from said platform onto said table; means to horizontally move said table from underneath the thereon units; means to prevent said units from moving horizontally when said table is so moved; and means to return said table to its normal position.

31. In combination in a box-loading machine; a stationary horizontal platform dimensioned to receive a plurality of units of the load; a therewith flush movable table normally adjacent one side of said platform; means to horizontally push said units from said platform onto said table; means comprising a cam to horizontally move said table from underneath the thereon units; means to prevent said units from moving horizontally when said table is so moved; and means constantly spring tensioned to yieldingly return said table to, and hold it in, its normal position.

32. In combination in a box-loading machine, a horizontal, horizontally movable, table; means to arrange thereon a plurality of units of the load in a mutually contacting symmetrical group; a plurality of like grasping devices suspended normally above said group and each of which is alined with one of the members of said first mentioned group; means comprising a cam to so suspend said grasping devices, to lower them by aid of gravity into contact with said load-units and thence below the level of the table, and to return them against gravity to their said normal positions; means to connect said grasping devices with said cans; means to horizontally move said table from beneath said load-units when so connected with said grasping devices; and means to disconnect said grasping devices from said load-units.

33. In combination in a box-loading machine, a horizontal, horizontally movable, table; means to range thereon a plurality of units of the load in a mutually contacting symmetrical group; a plurality of like grasping devices suspended normally above said group and each of which is alined with one of the members of said group; means comprising a cam to so suspend said grasping devices, to lower them by aid of gravity into contact with said load-units and thence below the level of the table, and to return them against gravity to their said normal positions; means to connect said grasping devices with said cans; means comprising a cam to horizontally move said table from underneath said load units when so connected with said grasping devices; means to disconnect said grasping devices from said load-units; and means constantly tensioned to yieldingly return said table to, and hold it in, its normal position when said grasping devices are above it.

34. In combination in a box-loading machine, a horizontal, horizontally movable, table; means to range thereon a plurality of units of the load in a mutually contacting symmetrical group; a plurality of like pneumatic grasping devices suspended normally above said group and each of which is alined with one of the members of said group; means comprising a cam to so suspend said pneumatic grasping devices, to lower them by aid of gravity into contact with said load-units and thence below the level of the table, and to return them against gravity to their said normal positions; means constantly spring-tensioned to operatively connect said pneumatic grasping devices with an air exhaust; means, comprising a cam, to horizontally move and hold said table from beneath said load-units after the latter have been pneumatically connected with said grasping devices; means comprising a cam to break said pneumatic connection; and means constantly tensioned to yieldingly return said table to, and hold it in, its normal position when said grasping devices are above it.

35. In combination in a box-loading machine, a runway for a box; a box-carrier disposed normally at the inlet of said runway; means constantly spring-tensioned to advance said carrier in said runway; means, comprising a cam, to stop said carrier at a predetermined location in said runway and to return it to, and hold it in, its normal position.

36. In combination in a box-loading machine, a runway for units of the load; a runway for a box; a box-carrier disposed normally at the inlet of said box runway; means constantly spring-tensioned to advance said carrier in said runway; means, comprising a cam-disk, rotation of which is controlled by a unit of the load in its said runway, to stop said carrier at a predetermined location in said runway and to return it to, and hold it in, its said normal position.

37. In combination in a box-loading machine, a horizontal runway for a box; a carrier comprising a platform on which rests the box; means to propel the carrier in said runway; means to stop the carrier at a predetermined location in said runway; means normally below the level of said platform and constantly spring-tensioned to elevate the box off of said carrier; and means comprising a cam to return said elevating means to, and hold them in, their normal position.

38. In combination in a box-loading machine, a horizontal runway for a rectangular box; a carrier for the box in said runway; means to advance the carrier in said runway; means to retract the carrier and hold it stationary at a predetermined location in said runway; a horizontal platform for the box carried by said carrier; a member carried in front by said platform and having a rearwardly inclined surface; a member carried behind by said platform and having forwardly a surface at right angles to said platform; and a gravity chute for the box venting above said predetermined location and conformed to deliver it partly upon said first mentioned inclined surface.

39. In combination in a box-loading machine, a horizontal runway for a rectangular box; a carrier for the box in said runway; means to advance the carrier in said runway; means to retract the carrier and hold it stationary at a predetermined location in said runway; a horizontal platform for the box carried by said carrier; a member carried in front by said platform and having a rearwardly inclined surface; a member carried behind by said platform and having forwardly a surface at right angles to said platform; a gravity chute for the box venting above said predetermined location and conformed to deliver it partly upon said first mentioned inclined surface; means constantly spring-tensioned to support a box against gravity in said chute; and means controlled by said carrier to withdraw said last mentioned means from the chute.

40. In combination in a box-loading machine, a horizontal runway for a box; a box carrier of less width than the box; means to propel said carrier and thereby carried box in the runway; a pair of mutually opposite vertically movable elevators disposed in the runway to straddle the carrier and normally underlie therefrom projecting portions of the box; means to reduce friction between said elevators and the box; means to stop the carrier when between the elevators; means to raise the elevators above the level of the carrier; means to retract the carrier from between the elevators; means to lower the elevators to their normal level; and, a floor extending from the elevators to the outlet of the runway, and comprising means to reduce friction between it and the boxes and flush with the tops of the elevators at their normal level.

41. In combination in a box-loading machine, a horizontal runway for a box; a box-carrier in said runway; a platform rigidly mounted on said carrier, for, and of less width than, the box; a pair of mutually opposite vertically movable elevators in the runway spaced apart to straddle the platform and normally underlie therefrom-projecting portions of the box; means constantly exerted to advance the carrier to a location where its platform is between the elevators; means to intermittently stop the carrier during an interval at said location, thereafter retract it therefrom, and release it to repeat its said advance with another box; means to raise, during said interval, the elevators and thus the first mentioned box, above the level of the platform; means after retraction of the carrier, to lower the elevators, carrying the first mentioned box, to their normal level; and, extending from the elevators toward the outlet of the runway, a floor for the boxes.

42. In combination in a machine for filling a box with like packages, a main power shaft; means to constantly rotate said shaft; a runway for the packages; means constantly operatively connected with said power shaft to advance the packages in said runway; a removable table normally adjacent the delivery end of said runway; means constantly spring-impelled to move said table toward its normal position; means normally disconnected with said power shaft to intermittently remove, and hold, said table from its normal position; means constantly spring-impelled to, independently of said power shaft, push packages from adjacent said runway onto said table while in its normal position; means normally disconnected with said power shaft to intermittently retract and hold said pushing means against their said spring-impulse; vertically movable means normally above said table to grasp thereon packages and suspend them while lowered by gravity on removal of the table; a runway for the boxes; a movable box-carrier normally adjacent the inlet of said box-runway; means constantly spring-impelled to move the carrier in said runway to beneath said table; means normally disconnected with said power shaft to intermittently retract said carrier toward, and hold it in, its normal position; and means controlled by a package in its said runway to operatively connect with said power shaft the aforesaid therewith normally disconnected means.

43. In combination in a machine for filling a box with like packages, a main power shaft; means to constantly rotate said shaft; a runway for the packages; means constantly operatively connected with said power shaft to advance the packages in said runway; box-moving means constantly spring-impelled toward a predetermined location; means normally disconnected with said power shaft to intermittently hold and move said box-moving means against their said spring-impulse; package-moving means constantly spring-impelled to move packages from their said runway toward said location; means normally disconnected from said power shaft to intermittently hold and move said package-moving means against their said spring-impulse; and means controlled by a package in its said runway to operatively connect with said power shaft the aforesaid therefrom normally disconnected means.

44. In combination in a machine for filling a box with like packages, a main power shaft; means to constantly rotate said shaft; a runway for the packages; means constantly operatively connected with said power shaft to advance the packages in said runway; means constantly spring-impelled to move packages from said runway toward a predetermined location; means normally disconnected from said power shaft to intermittently move and hold said last mentioned means against their said spring-impulse; and means controlled by a package in its said runway to operatively connect with said power shaft the aforesaid therefrom normally disconnected means.

45. In combination in a machine for filling a box with like packages, a main power shaft; means to constantly rotate said shaft; a runway for the packages; means constantly operatively connected with said power shaft to advance the packages in said runway; means constantly spring-impelled to move packages from said runway toward a predetermined location; means normally disconnected from said power shaft to intermittently move and hold said last mentioned means against their said spring impulse; an oscillatable two-armed lever disposed adjacent one side of said runway, one arm of which is spring-tensioned to project normally into the path of the packages in said runway; and, means controlled by the other arm of said lever to operatively connect with said power shaft the aforesaid therefrom normally disconnected means.

46. In combination in a box-loading machine, a stationary platform adapted to support a plurality of load-units in a symmetrically marshaled group; normally bounding one side of said platform a pusher; normally bounding the opposite side of said platform a deflectable plate; and means to impel said pusher over said platform in the direction of said plate.

FRANK ROGERS.
BURT E. TAYLOR.

Witnesses:
WALTER ENGELS,
THEODORE D. WARBEL.